United States Patent [19]
Beck et al.

[11] 3,766,038
[45] Oct. 16, 1973

[54] PRODUCTION OF CYCLOALKANONE OXIMES

[75] Inventors: Fritz Beck; Hugo Fuchs, both of Ludwigshafen; Kurt Kahr, Hambach; Gerd Wunsch, Speyer, all of Germany

[73] Assignee: Badische Anilin- & Soda-Fabrik Aktiengesellschaft, Ludwigshafen, Germany

[22] Filed: Dec. 15, 1971

[21] Appl. No.: 208,062

[52] U.S. Cl.............................. 204/180 P, 204/131
[51] Int. Cl............................................. B01d 13/02
[58] Field of Search ............... 204/180 P, 301, 130, 204/131

[56] References Cited
UNITED STATES PATENTS

| | | |
|---|---|---|
| 2,739,934 | 3/1956 | Kunin..................... 204/180 P X |
| 3,394,068 | 7/1968 | Calmon et al................... 204/180 P |
| 3,607,694 | 9/1971 | Heit et al......................... 204/180 P |
| 3,673,068 | 6/1972 | Seko et al........................ 204/180 P |

Primary Examiner—Howard S. Williams
Assistant Examiner—A. C. Prescott
Attorney—Johnston, Root, O'Keeffe, Keil, Thompson and Shurtleff

[57] ABSTRACT

A process for the production of cycloalkanone oximes by reaction of cycloalkanones with hydroxylammonium salts or mixtures thereof with ammonium salts and acids in aqueous solution. The free and combined acid is removed from the mixtures by electrodialysis before, during or after the oximation. The reaction of the cycloalkanone to the oxime is preferably carried out in the cathode chamber of an electrodialysis cell. Complete oximation of the cycloalkanone is achieved.

7 Claims, 4 Drawing Figures

Patented Oct. 16, 1973 3,766,038

PRODUCTION OF CYCLOALKANONE OXIMES

It is known that cycloalkanone oximes can be prepared by reaction cycloalkanones with hydroxylamine. In view of the instability of hydroxylamine, the starting material used is generally not free hydroxylamine but a salt thereof, preferably the sulfate such as is obtained direct in the usual industrial synthesis. The oxime is prepared from this salt in the presence of the cycloalkanone by the addition of a strong base, preferably ammonia.

This known method has the disadvantage that ammonium salts, particularly ammonium sulfate, are formed as a byproduct and in fact not in a form which can be directly used, but as a 20 to 40 percent aqueous solution. Fairly valuable chemicals such as ammonia and sulfuric acid are converted in this method into practically worthless aqueous ammonium sulfate solution.

Attempts have already been made to carry out the oximation without adding ammonia or other substances having a basic reaction. It is true that the oxime is formed in this case at high temperature but only up to equilibrium with the salt of the oxime which remains dissolved in the aqueous phase. Moreover some unreacted cycloalkanone remains. Complete conversion cannot be achieved even by extracting the oxime with a solvent as for example with cyclohexane or with benzene.

We have now found that complete oximation of a cycloalkanone by reaction with a hydroxylamnonium salt or a mixture of the same with an ammonium salt and an acid in an aqueous solution is achieved when the free and combined acid is removed from these mixture by electrodialysis before, during or after the oximation.

Cycloalkanones in general, for example cyclohexanone, methylcyclohexanone, cyclooctanone and cyclododecanone can be converted almost quantitatively into the corresponding oximes by the process of this invention. Reaction of the cycloalkanone to the oxime is preferably carried out in the cathode chamber of an electrodialysis cell so that the hydroxylamine liberated by continuous removal of sulfuric acid reacts immediately with the cycloalkanone. The advantage of the process resides in the fact that no bases, for example ammonia, have to be liberated and free and combined sulfuric acid is recovered. A particularly advantageous embodiment of the process consists in concentrating the sulfuric acid in the anode chamber up to the usual strength for the production of hydroxylamine and withdrawing it continuously.

DESCRIPTION OF DRAWING

FIG. 1a shows diagrammatically the construction and method of operation of a divided electrolytic cell which is suitable for carrying out the process of the invention. An anion-exchange member (AAM) serves as a diaphragm. The diaphragm is selectively permeable to anions. At the beginning of the electrolysis a very dilute acid is present in the anode chamber and in the cathode chamber there is present an aqueous solution of hydroxylammonium sulfate with or without additional free sulfuric acid and the cycloalkanone which is emulsified or suspended in this solution. The (theoretical) conversions of substance upon the passage of 1 faraday through the electrolytic cell are entered in FIG. 1a. The electrolytic decomposition of water accordingly takes place as the empirical electrode process. The hydrogen liberated in the reaction may be reused for the production of hydroxylammonium sulfate, for example according to the catalytic NO reduction method with hydrogen, whereas the oxygen formed at the anode may be used for example for burning ammonia to pure nitrogen monoxide. At the same time one equivalent of sulfate ions is passed into the anode chamber through the anion exchanger membrane. Since in the electrolysis of water the cathode may be regarded as a source of $OH^{(-)}$ ions and the anode as a source of $H^{(+)}$ ions, there is thus formed in the cathode chamber 1 mole of free hydroxylamine which further reacts with the cycloalkanone to form the oxime and in the anode chamber the amount of sulfuric acid is increased by 1 equivalent. The sulfuric acid formed in the anode chamber may similarly be used again in the synthesis of hydroxylamine sulfate.

In addition to the simplest design of electrodialysis cell according to FIG. 1a, there are other arrangements. FIG. 1b discloses a cell having two anion exchange membranes, in which oximation takes place in the central portion of the cell. In this way neither the starting materials nor the reaction products come into contact with the cathode so that electrochemical reduction for example of hydroxylamine to ammonia, of cycloalkanone to cycloalkanol and of cycloalkanone oxime to cycloalkylamine is precluded.

Figure 1A:
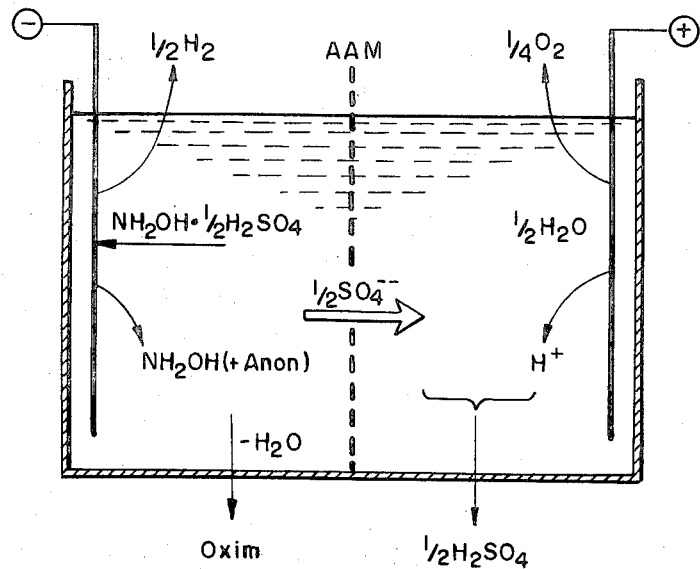
FIG. 1a is an elevation view in cross section of a divided electrolytic cell with an anion-exchange membrane as a diaphragm.
Figure 1B:
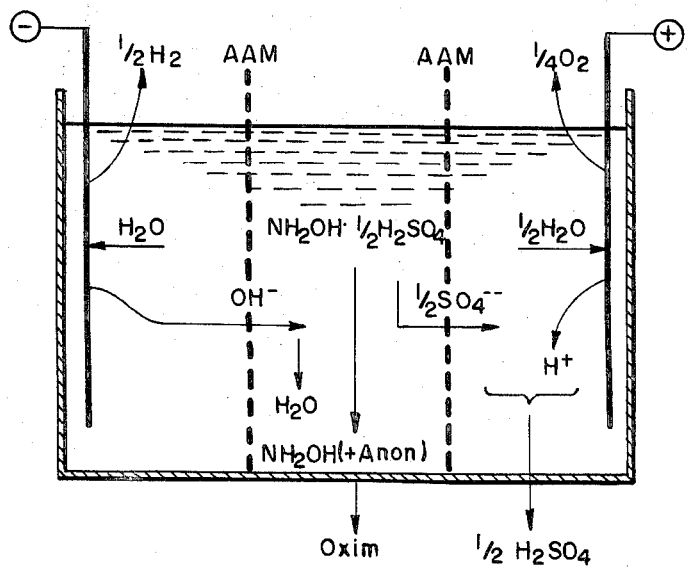
FIG. 1b is an elevation view in cross section of a divided electrolytic cell with two anion-exchange membranes.

By suitable choice of cathode material however a reduction upon direct contact of the substrate with the cathode can be stopped. Generally the simplest design of cell according to FIG. 1a is preferred.

For carrying out the process industrially, the cells may be designed for larger capacities by either enlarging the electrode area or increasing the number of electrodes. A plurality of electrodes is advantageously connected bipolar in series and combined into a cell block on the filter press principle. The recycling of catholyte and anolyte is carried out in parallel.

Anion exchanger membranes are preferred as semipermeable partitions in the cells.

The ion exchange material may consist for example of polystyrene (crosslinked with divinylbenzene) which bears on the benzene nucleus dialkylamino groups which in turn have been converted into quaternary ammonium ions. The membranes may be homogeneous or heterogeneous in structure; in the latter case polyvinyl chloride, polypropylene, polyamides or other inert polymers may function as binders.

The cathode should advantageously consist of a material at which only hydrogen is developed without the hydroxylamine, the cycloalkanone and/or the cycloalkanone oxime being reduced. Nickel and chromium nickel steel are suitable, especially when the cathode has a smooth surface.

It is advantageous to use for the anode a material which does not dissolve in aqueous sulfuric acid when current is passed. For example platinum metals, platinized titanium, titanium coated with platinum oxide and titanium dioxide, lead dioxide on lead, or lead dioxide on titanium, satisfy these conditions.

The composition of the catholyte depends on the embodiment of the oximation; two cases are to be distinguished:

I. The entire oximation is carried out in the cathode chamber of the cell. The aqueous phase contains 50 to 400 g/liter of hydroxylamine in the form of the sulfate, and may contain additionally 5 to 30 g/liter of free sulfuric acid and/or 5 to 30 g/liter of ammonium sulfate. At the beginnung of the electrolysis an amount of cycloalkanone equivalent to the hydroxylamine is suspended in this solution. It is advantageous however to add the cycloalkanone in about an excess of twice to the first cell and to carry oximation of the unreacted cycloalkanone together with the oxime formed with an excess of hydroxylammonium sulfate in a second cell. The excess hdydroxylammonium sulfate is returned to the first stage after separation of the oxime.

II. To prevent the whole of the oxime occurring in the cell, the stoichiometrically supplied cycloalkanone may be first reacted in a separate reactor up to be equilibrium point with aqueous hydroxylammonium sulfate solution. After separation of the organic phase of the cycloalkanone oxime, the strong acid aqueous phase, which contains not only unreacted cycloalkanone but also some of the cycloalkanone oxime formed as sulfate, is electrolyzed in the cell until the free and combined acid has been removed.

The anolyte consists of dilute sulfuric acid in a concentration of from 2 to 30 percent. The selectivity of the process decreases somewhat at high concentrations of sulfuric acid. In batchwise operation for example the anolyte sulfuric acid can be concentrated up to 3 to 30 percent.

Continuous operation of the cells is possible if the catholyte is kept in the neighborhood of complete conversion by continuously metering in cycloalkanone and hydroxylammonium sulfate solution while continuously removing cycloalkanone oxime and water. Water removed from the system contains an amount of oxime corresponding to its solubility and this can easily be recovered by extraction with an organic solvent which has little or no miscibility with water. It is preferred to use as extractant the corresponding cycloalkanone which can be returned to the first cell together with the cycloalkanone which is recovered by steam distillation from the raffinate phase. At the same time the content of sulfuric acid in the anolyte is kept at the desired level by continuous removal of anolyte and continuous metering in of distilled water.

The current density is from 1 to 100, preferably from 5 to 30, amps/dm$^2$. The temperature of the catholyte depends on the cycloalkanone to be oximated and on the resistance to temperature of the ion exchange membrane. In the case of cyclohexanone the temperature of the catholyte is from 40° to 80° C, preferably from 60° to 80° C. Oximes obtained in this way are suitable both for rearrangement into lactams by the classic Beckmann method with sulfuric acid and for catalytic rearrangement.

The following Examples illustrate the invention.

EXAMPLE 1

Figures 2, 2A:
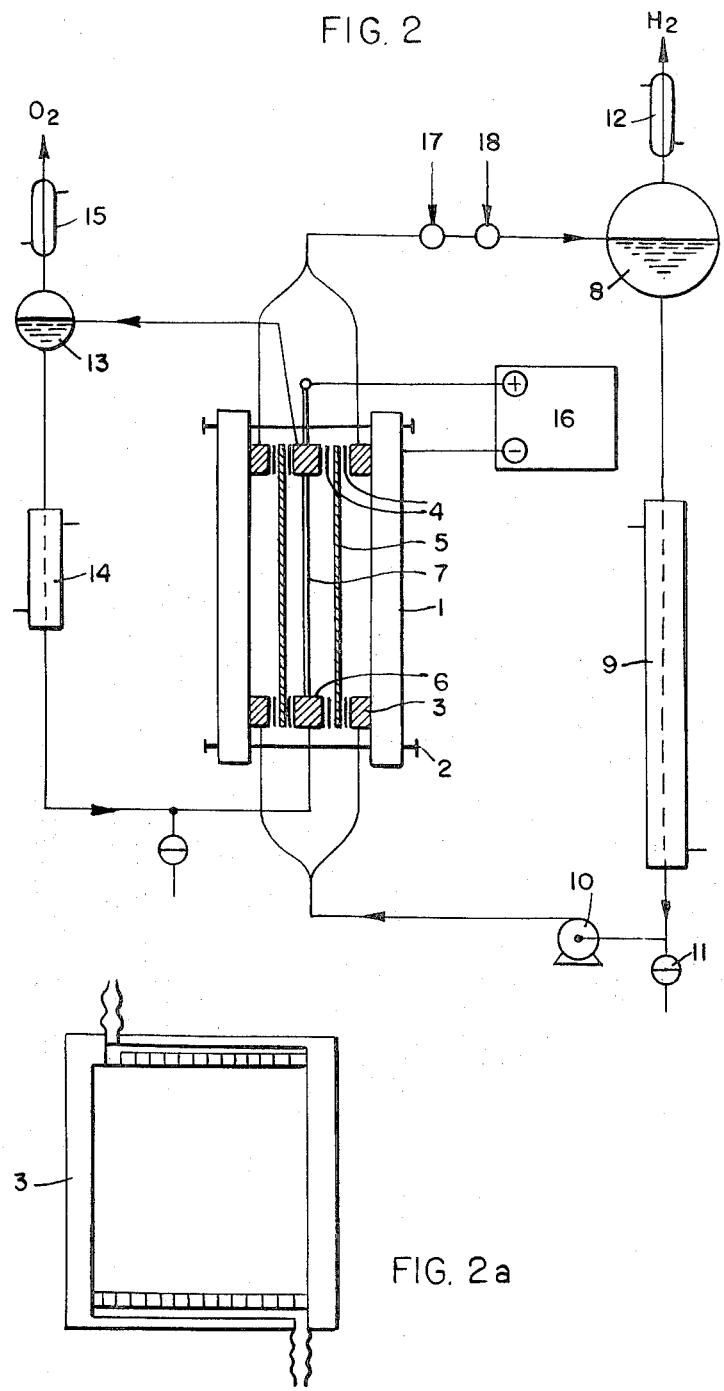
FIG. 2 illustrates a cell within a system used in the process for the production of cycloakanone oximes.
FIG. 2a is a view of the chamber frames as used in the apparatus of FIG. 2.

The electrolytic cell is constructed according to FIG. 2 as follows: two end plates (1) of nickel-plated iron function as cathodes with a cathode surface area of 2 × 4 dm$^2$ at the same time hold together the following parts in the manner of a filter press by means screw bolts (2): two cathode chamber frames (3) of polypropylene in which are provided pectinate channels for the supply and removal of the catholyte (cf. FIG. 2a); sealing rings (4) of PERBUNAN; anion exchange membranes (5) of PERMAPLEX A 20; and anode chamber frames (6) of polypropylene with which the anodes (7) of platinized titanium (3 microns of platinum) makes a liquid-tight fit. Coarse meshed polypropylene fabric is inserted as spacers between the membranes and the electrodes.

The cathode chambers of the cell are attached to a liquid cycle consisting of a gas separator (8), heat exchanger (heater) (9) and a circulating pump (10). A valve (11) serves for emptying the system. Hydrogen leaves the system through a cooler (12). pH and temperature are measured continuously at points (17) and (18). The anode space of the cell is connected in exactly the same way to a liquid cycle consisting of a gas separator (13) and a heat exchanger (14). The pump is dispensed with in this case because the anolyte circulates slowly due to the thermosyphon and air-lift effects. The oxygen is removed through a cooler (15). The current source (16) supplied direct current.

At the beginning of the electrolysis, 2.64 l of an aqueous solution having the composition:

114.2 g/liter of $NH_2OH$
169.5 g/liter of $H_2SO_4$ (combined)
18.6 g/liter of $H_2SO_4$ (free)
18.0 g/liter of $(NH_4)_2SO_4$ and the equivalent amount of cyclohexanone (865 g) are introduced into the cathode circulation. The anode circulation is charged with 3 percent sulfuric acid. Substantial emulsification of the cyclohexanone in the aqueous phase is achieved by rapid circulation by the pump. After the catholyte has been heated up to 60° C, a current of 40 amps (equivalent to a current density of 5 amps/dm$^2$) is switched on. One hour later the catholyte begins to become turbid and an increasing amount of cyclohexanone oxime separates out. The pH of the solution is initially 0.1 and changes only slowly in the first phases of the electrolysis but toward the end it becomes rapidly higher. After a pH of 4.5 has been reached, electrolysis is stopped. The period up to this point is 10.6 hours. The cell potential is 4.1 volts at the beginning of the electrolysis, 4.3 volts after five hours and 4.7 volts toward the end. In order to convert the free and combined sulfuric acid in the anode chamber, $(188.1 \times 2.64)/49 \times 26.8 = 272$ ampere hours would be necessary theoretically. Since a total of 424 ampere hours have elapsed, the current efficiency and therefore the selectivity of the membrane is 64 percent. After the reaction solution has been cooled, a total of 1,030 g of cyclohexanone oxime (i.e. nearly 100 percent of theory, with reference to cyclohexanone used) is obtained from the catholyte by separation followed by extraction of the filtrate with benzene and removal of the benzene by distillation. The concentration of sulfuric acid in the anolyte has increased from 3 percent to 18.3 percent during the electrolysis.

EXAMPLE 2

A laboratory-type rotating-disc column (height 1 meter, diameter 50 mm) is fed at the top with 4 moles per hour of hydroxylamine as an aqueous sulfuric acid sulfate solution according to Example 1 and at the bottom with 4 moles per hour of cyclohexanone as a 20 percent benzene solution at 60° C. A total of 7.85 kg of the hydroxylamine sulfate solution and 11.76 kg of the mixture of cyclohexanone and benzene containing 20 percent of cyclohexanone is reacted. The discharge is then separated into two phases.

8.47 kg of aqueous lower phase contains 9.2 percent of oxime and 0.3 percent of unreacted cyclohexanone;

11.08 kg of benzene upper phase contains 15.9 percent of oxime and 1.1 percent of unreacted cyclohexanone.

This is equivalent to a conversion of 93.5 percent.

30.7 percent of the oxime formed is present in the lower phase and 69.3 percent in the upper phase. The oxime combined as sulfate in the strongly acid lower phase is liberated by electrodialysis. 3.6 liters (4 kg) of the lower phase is introduced for this purpose into the cathode circulation of the cell described in Example 1. The anolyte is again 3 percent $H_2SO_4$. At the beginning the catholyte contains, in addition to 9.2 percent of oxime:

7.4 g/liter of $NH_2OH$
11.0 g/liter of combined $H_2SO_4$
172.3 g/liter of free $H_2SO_4$
15.6 g/liter of $(NH_4)_2SO_4$.

After 79 g of cyclohexanone has been added electrolysis is continued at a current density of 10 amps/dm$^2$ (1 = 80 amps) and 35° C with circulation by pumping until the pH in the cathode chamber has risen from an original value of 0.1 to 4.5. This is the case after 6.0 hours. The cell potential rises during this time from 3.9 to 4.5 volts. A total of 409 g of oxime is deposited in the catholyte and can easily be separated by filtration. The amount of 50 g of oxime missing is about equivalent to the amount remaining in solution according to the solubility in water (1.25 percent) and this can also be isolated by extraction, for example with benzene. The final concentration of sulfuric acid in the anolyte is 21.3 percent. The current efficiency calculated from the electrolysis period is 75 percent (with reference to the free and combined sulfuric acid).

EXAMPLE 3

In the manner described in Example 1, 2.2 liters of an aqueous hydroxylammonium sulfate solution having the composition:

114.2 g/liter of hydroxylamine,
169.5 g/liter of combined sulfuric acid
18.6 g/liter of free sulfuric acid and
18.0 g/liter of ammonium sulfate and the equivalent amount (i.e., 1,380 g) of cyclododecanone are introduced into the cathode circulation. The temperature is 70° C. The anode chamber is charged with 3 percent by weight sulfuric acid. Substantial emulsification of the cyclododecanone in the aqueous phase is achieved by rapid circulation of the cathode liquid by pumping.

A current of 40 amps, corresponding to a current density of 5 amps/dm$^2$ is then switched on. The pH of the solution at first changes only slightly from the original 0.2. After the pH has reached 5.5 to 6.0 cyclododecanone oxime begins to separate out in the solution. The reaction is stopped at a pH of 6.8. The running time is 9.3 hours. The cell potential is 4.5 volts at the beginning and 5.4 volts at the end. The current efficiency is determined as 61 percent. After the reaction is over, 1,460 g of cyclododecanone oxime having a melting point of 126° C can be isolated from the catholyte by cooling and filtering as well as by extracting the filtrate with benzene and removing the benzene. This is equivalent to a yield of 97.6 percent based on the cyclododecanone used. The concentration of sulfuric acid in the anolyte rises to 17.5 percent.

The invention has been described by way of example for the use of hydroxylammonium sulfate. The process may however also be carried out with other salts of hydroxylamine.

We claim:

1. A process for the production of cycloalkanone oximes by reaction of a cycloalkanone with a hydroxylammonium salt or a mixture of the same with an ammonium salt and the corresponding acid in aqueous solution, which comprises removing the free and combined acid from the mixture by electrodialysis.

2. A process as claimed in claim 1 wherein the free and combined acid is removed before the oximation process by electrodialysis.

3. A process as claimed in claim 1 wherein the free and combined acid is removed during the oximation process by electrodialysis.

4. A process as set forth in claim 3 wherein the reaction is carried out in the cathode chamber of an electrodialysis cell which contains an anion exhange membrane as a diaphragm.

5. A process as set forth in claim 3 wherein electrolysis of the reaction mixture is continued until equilibrium between free oxime and the salt of the oxime has been set up, with or without extraction of the free oxime, and the aqueous phase is further treated in the electrodialysis cell until the cycloalkanone is completely reacted.

6. A process as set forth in claim 3 wherein a nickel cathode is used which has a smooth surface.

7. A process as set forth in claim 3 wherein a chromium nickel steel cathode is used which has a smooth surface.

* * * * *

UNITED STATES PATENT OFFICE
CERTIFICATE OF CORRECTION

Patent No. 3,766,038          Dated October 16, 1973

Inventor(s) Fritz Beck et al

It is certified that error appears in the above-identified patent and that said Letters Patent are hereby corrected as shown below:

First page, left-hand column, line 12, insert
-- [30]   Foreign Application Priority Data
        December 18, 1970    Germany . . . . P 20 62 436.6 --.

Column 1, line 29, "hydroxylamnonium" should read
-- hydroxylammonium --.

Signed and sealed this 17th day of September 1974.

(SEAL)
Attest:

McCOY M. GIBSON JR.                  C. MARSHALL DANN
Attesting Officer                     Commissioner of Patents